United States Patent
Katorgin et al.

(10) Patent No.: US 6,226,980 B1
(45) Date of Patent: May 8, 2001

(54) LIQUID-PROPELLANT ROCKET ENGINE WITH TURBINE GAS AFTERBURNING

(75) Inventors: Boris Ivanovich Katorgin; Vladimir Konstantinovich Chvanov, both of Khimki; Gennady Grigorievich Derkach, Moscow; Jury Vasilievich Movchan, Khimki; Felix Jurievich Chelkis, Khimki; Vadim Iliich Semenov, Khimki; Leonid Alexeevich Tolstikov, Khimki, all of (RU)

(73) Assignee: Otkrytoe Aktsionernoe Obschestvo Nauchno-Proizvodstvennoe Obiedinenie "Energomash" Imeni Akademika V.P. Glushko (RU)

( * ) Notice: Subject to any disclaimer, the term of this patent is extended or adjusted under 35 U.S.C. 154(b) by 0 days.

(21) Appl. No.: 09/393,435

(22) Filed: Sep. 10, 1999

(30) Foreign Application Priority Data

Jan. 21, 1999  (RU) .................................. 99100839

(51) Int. Cl.$^7$ ................................ F02K 9/48; F02K 9/52
(52) U.S. Cl. ........................................... 60/258; 60/259
(58) Field of Search ........................... 60/257, 258, 259, 60/260, 267

(56) References Cited

U.S. PATENT DOCUMENTS 3,623,329 * 11/1971 Abild ................................ 60/259
4,171,615 * 10/1979 Stewart et al. .................... 60/259
5,551,230 * 9/1996 Meng ................................. 60/259
5,873,241 * 2/1999 Foust ................................ 60/259

OTHER PUBLICATIONS

Gakhun, G. G. *Liquid–Propellant Rocket Engine Design and Engineering*, Moscow, 1989, pp. 92–95.

* cited by examiner

*Primary Examiner*—Louis J. Casaregola
(74) *Attorney, Agent, or Firm*—Blakely Sokoloff Taylor & Zafman

(57) ABSTRACT

The engine comprises a chamber, fuel and oxidizer booster pumps, a turbopump unit, a gas generator, an electrically driven thrust regulator, and a fuel throttle. A programmable starting and ignition system is introduced, which includes a fuel tank, connected to the thrust regulator, and a first ampoule with starting fuel, an output of which through a starting/cut-off valve is connected to fuel injectors of the gas generator. The aforesaid tank is also connected through a second ampoule to the starting fuel and by a jet to autonomous ignition injectors located in the space of the combustion chamber of the engine. An inclined Archimedian screw pump with a gas turbine as an actuator and an oxidizing gas as a working medium is used as an oxidizer booster pump. The gas is discharged after its use in a turbine into an outlet manifold of the booster pump. A heat exchanger, in which the gas used for rocket tank pressurization is heated, is mounted on a pipeline feeding the gas to the aforesaid gas turbine of the booster pump actuator.

8 Claims, 1 Drawing Sheet

LIQUID-PROPELLANT ROCKET ENGINE WITH TURBINE GAS AFTERBURNING

FIELD OF THE INVENTION

The invention relates to rocket engineering, in particular, to liquid-propellant rocket engines in which the generator gas, being the working medium for a turbine, is afterburnt in the combustion chamber of the engine.

BACKGROUND OF THE INVENTION

A liquid-propellant rocket engine (LRE) with turbine gas afterburning in the combustion chamber of the engine is known. This engine comprises a chamber, two separate turbopump units, booster prepumps mounted on inlet lines, a fuel—liquid hydrogen—pump and an oxidizer—liquid oxygen—pump, a thrust and propellant mixture ratio control system, electric spark ignition units and automatic equipment, ensuring engine starting and shut down ("Liquid-Propellant Rocket Engine Design and Engineering," edited by Prof. G. G. Gakhun, Moscow, Mashinostroenie, 1989, p. 93).

The known engine ensures a high level of reliability parameters and survivability, but a too low liquid hydrogen density (70 kg/m$^3$) and, as a result thereof, the low density of oxygen-hydrogen propellant substantially limits the use of this propellant composition, and the engine correspondingly, for the first stages of launchers.

The technical solution most similar to the present invention is an LRE with oxidizing turbine gas afterburning in the engine chamber ("Liquid-Propellant Rocket Engine Design and Engineering," edited by Prof. G. G. Gakhun, Moscow, Mashinostroenie, 1989, p. 93).

The known engine comprises a chamber, a turbopump unit with a two-stage fuel pump and a single-stage oxidizer pump, a gas generator, a thrust controller, a throttle for controlling the fuel and oxidizer ratio in the combustion chamber, and automatic equipment for starting and shutting down the engine.

A jet ejector is mounted upstream the oxidizer pump in order to increase the input pressure. This ejector operates on a part of the oxidizer tapped from a high-pressure pipeline downstream the pump. Rocket tank pressurization is carried out using gases produced in autonomous gas generators of the engine.

The known liquid-propellant rocket engine has a relatively simple design, in which neither an ignition system, nor a complicated starting system is used.

But the use of highly toxic components, such as nitrogen tetroxide and unsymmetrical dimethylhydrazine, producing highly toxic products during the combustion process, as a propellant in the known engine does not currently meet the requirements for ecological safety.

Another distinctive feature of the known engine is that it is started using a preliminary stage mode. However, this procedure does not exclude peaks (brief overtemperature and overpressure) in the turbine gas temperature and pressure in the main assemblies while the engine is reaching the nominal mode.

The use of a jet ejector as a booster prepump for the oxidizer does not make it possible to use the engine at low input pressures.

Besides, the use of autonomous gas generators for the rocket tank pressurization, equipped with their own special start/cut-off automatic equipment makes the engine design more complicated.

SUMMARY OF THE INVENTION

The object as the base of the present invention is to increase ecological safety and improve the technical-operating characteristics of the engine, including energetic characteristics of the propellant and oxidizer feed system.

Engineering results of the present invention are the assurance of engine operation on low-toxic non-hypergolic propellant components, reduction of dynamic actions of the engine upon the rocket during the start and improvement of pressurization system efficiency.

The essence of the invention consists of introducing a programmable start and ignition device into an LRE and connecting it to structural elements of the engine in a certain manner. Wherein, the liquid-propellant rocket engine with turbine gas afterburning comprises:

a combustion chamber, inside which a mixing head of a working mixture is mounted and in which additional ignition injectors are provided;

booster prepumps—a fuel booster pump and an oxidizer booster pump, mounted at an engine inlet;

a turbopump unit comprising a turbine, a single-stage oxidizer pump and a two-stage fuel pump, which are made as centrifugal inclined Archimedian screw pumps and the inlet main lines of which are connected to the aforesaid booster prepumps respectively, an outlet of the first stage of the two-stage fuel pump is connected through a throttle sequentially to cooling channels of the aforesaid chamber and through a start/cut-off valve further to the mixing head of the aforesaid combustion chamber;

a gas generator, a mixing head with injectors of which through an oxidizer start/cut-off valve is connected to an outlet of the aforesaid oxidizer booster pump, and through a thrust regulator is connected to an outlet of the second stage of the two-stage fuel pump of the aforesaid turbopump unit, an outlet of the gas generator is connected to an inlet into the aforesaid turbine of the turbopump unit, and through a gas feed line is connected to an inlet of the aforesaid mixing head of the combustion chamber;

a programmable start and ignition device made with a starting tank with fuel, the tank being connected through a first check valve to the aforesaid thrust regulator, controlled by an electric drive, a first ampoule with starting fuel, an outlet of which through a start/cut-off valve is connected to injectors of the aforesaid mixing head of the gas generator, wherein the aforesaid starting tank through a second check valve, a second ampoule with starting fuel and a jet is connected to ignition injectors of the combustion chamber, and through a fill check valve is connected to a main fuel feed line to an input of the fuel pump.

Additional variants of realization of the aforesaid LRE are possible, wherein it is advisable that:

the aforesaid oxidizer booster pump was made as an inclined Archimedian screw pump and is provided with a gas turbine which is its actuator, the working medium of which is oxidizing gas, tapped from the aforesaid turbine of the turbopump unit, and after the booster pump on the gas turbine is actuated, released into its outlet manifold;

a heat exchanger was introduced into the LRE to heat the rocket tank pressurization gas, the heat exchanger being mounted on the pipeline for tapping oxidizing gas of the aforesaid turbine of the turbopump unit to drive the aforesaid oxidizer booster pump;

the pipeline for tapping the aforesaid oxidizing gas was led out downstream of the turbine of the turbopump unit;

helium was used as the gas for pressurizing the rocket tanks;

a mixture of triethyl boron and triethyl aluminum was used as the starting fuel;

the first ampoule with the starting fuel was equipped with a diaphragm made with the possibility of breaking under the action of pressure;

the second ampoule with the starting fuel was equipped with a diaphragm, made with the possibility of breaking under the action of pressure.

BRIEF DESCRIPTION OF THE DRAWINGS

The aforesaid advantages and also distinctive features of the present invention will be more fully understood from a description of the preferred embodiment thereof with references to the drawing.

DESCRIPTION OF THE PREFERRED EMBODIMENT

Figure 1:
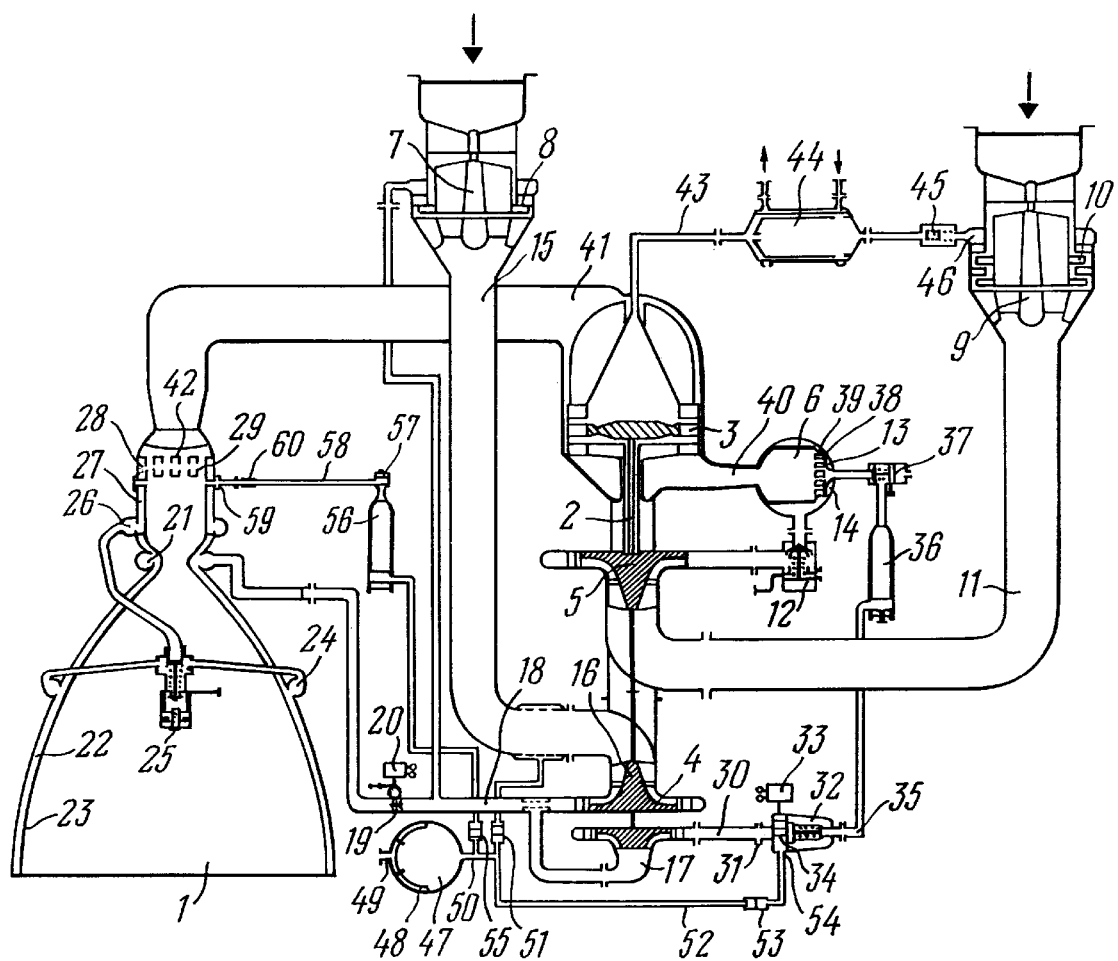
FIG. 1 shows a schematic diagram of a liquid-propellant rocket engine with turbine gas afterburning.

The liquid-propellant rocket engine comprises a combustion chamber 1, a turbopump unit (TPU) 2 consisting of a turbine 3, a two-stage fuel pump 4 and a single-stage oxidize pump 5, a gas generator 6, a fuel booster pump 7 driven by a hydraulic turbine 8, and an oxidizer booster pump 9 driven by a gas turbine 10.

The oxidizer booster pump 9 is connected by an inlet main line 11 to an oxidizer pump 5 inlet, an outlet of which through an oxidizer start/cut-off valve 12 is connected to a manifold space 13 of a mixing head 14 of the gas generator 6 with injectors.

The fuel booster pump 7 through an inlet main line 15 is connected to an inlet of a first stage 16 of the fuel pump 4. The first stage of the fuel pump 16 is connected to an inlet of a second stage 17 of the fuel pump and, through a pipeline 18, in which a throttle 19 with electric actuator 20 is mounted, to a manifold 21 of the combustion chamber 1, the fuel from which is distributed along regenerative cooling channels 22 of the combustion chamber.

The regenerative cooling channels 22 of nozzle 23 through a manifold 24 are connected to a start/cut-off valve 25. The outlet of this valve is connected to a manifold 26 located on the cylindrical part of the combustion chamber. The manifold 26 outlet through regenerative channels 27 for cooling the cylindrical part of the combustion chamber is connected to the fuel space 28 of mixing head 29 of the combustion chamber 1.

The second stage 17 of the fuel pump 4 through a pipeline 30 is connected to a main inlet 31 of a thrust regulator 32 which is controlled by an electric actuator 33 and is provided with a check valve 34 at its inlet. An outlet 35 of the thrust regulator 32 is connected to an ampoule 36 filled with starting fuel (hypergol), e.g. triethyl aluminum $Al(C_2H_5)_3$ or triethyl boron $B(C_2H_5)_3$.

The outlet from this ampoule is connected through a start/cut-off valve 37 to a fuel space 38 of a mixing head 39 of the gas generator 6. A gas generator outlet 40 is connected to the turbine 3, an outlet of which through a gas line 41 is connected to a space 42 of the mixing head 29 of the combustion chamber 1.

Furthermore, an outlet from the turbine 3 through a pipeline 43 in which a heat exchanger 44 and a pressure valve 45 are mounted is connected to a manifold 46 of a turbine driving the oxidizer booster pump 9.

An ignition and starting device comprises a starting tank 47 for fuel with a separating diaphragm 48, a branch pipe 49 for feeding a high-pressure gas and an outlet branch pipe 50. The outlet branch pipe 50 of the starting tank 47 is connected via a fill valve 51 to an inlet main line 15 for feeding fuel from the fuel booster pump 7. Furthermore, the outlet branch pipe 50 is at one side connected through a pipeline 52, in which a first check valve 53 is mounted, to a second inlet 54 of the thrust regulator 32 which is used to start the engine. At the other side the outlet branch pipe 50 is connected through a second check valve 55 to an ampoule 56 filled with a starting fuel (hypergol). An outlet of the ampoule 56 is connected through a check fill valve 57 to a main line 58 for feeding fuel to ignition injectors 59 of the combustion chamber. A jet 60, ensuring a dosed supply of the starting fuel to the injection injectors, is mounted in the main line 58.

The liquid-propellant rocket engine operates in the following manner.

The engine is started according to a "self-starting" procedure. The actuators 20 and are preliminarily set in positions ensuring the initial setting of the thrust regulator 32 and the throttle 19. Then the below-tank valves of the rocket (not shown) are opened, and the propellant components fill the spaces of the oxidizer and fuel pumps up to the start/cut-off valves 12 and 25 and of the check valve 34 of the thrust regulator 32, correspondingly, under the influence of hydrostatic and pressurization pressure. Filling the engine spaces with fuel is carried out up to the starting ampoules 36 and 56 through the fill valve 51, first and second check valves 53 and 55. The starting tank 47 is also filled with the main fuel. Such a state is considered to be the initial state for engine starting.

During the engine start the starting tank 47 is pressurized and fuel is pushed therefrom. The pressure of this fuel breaks the diaphragms (not shown) of the starting ampoules 36 and 56. Simultaneously, the start/cut-off valves 12 and 37 and 25 are opened, correspondingly. As a result, the starting fuel from the ampoules 36 and 56 under the action of pressure created by the starting tank enters the gas generator (through the open valve 37) and the chamber (through the check fill valve 57). The starting fuel entering the gas generator is ignited with oxygen, also entering the gas generator due to the pre-start pressurization of the rocket tanks and the hydrostatic pressure in them (not shown). The fuel, passing through the cooling passage of the combustion chamber, after a certain time enters the mixing head of the combustion chamber 1. During this delay time, a combustion process manages to start in the gas generator, and generator gas produced drives the turbine 3 of the TPU 2. After the turbine, the oxidizing gas through the gas line 41 enters the mixing head 29 of the combustion chamber where it is ignited together with the starting fuel coming from the ignition injectors 59, and is subsequently afterburnt with the fuel fed into the chamber. The moment at which both components enter the combustion chamber is selected so that the TPU 2 manages to pass to the operating mode while a counterpressure has not yet been established in the chamber 1.

As the pressure downstream the fuel pump 17 rises, the starting tank 47 is automatically excluded from operation by closing the first and second check valves 53 and 55, and the fuel supply to the gas generator 6 is switched to the fuel pump 17 by a programmed opening of the throttle of the thrust regulator 32. A part of the oxidizing gas from the turbine outlet is tapped to the actuator of the gas turbine 10 of the booster prepump 9. This gas, after passing through the heat exchanger 44, heats the gas meant for pressurization of the rocket tanks (not shown). After the turbine 10, the gas is discharged into the outlet manifold 11 where it is mixed with the main oxidizer flow and condensed. A part of the fuel from the outlet of pump 4 enters the actuator of the hydraulic turbine 8 of the booster fuel pump 7.

Furthermore, during the entire engine starting step, programmed control of opening the throttle of the thrust regulator 32 and the fuel throttle 19 from their initial states to states corresponding to a nominal engine operation mode is provided by corresponding actuators 33 and 20.

The use of gas tapped from the outlet of a TPU turbine as a working medium for the turbine actuator of the booster oxidizer pump makes it possible to reduce the temperature in the gas generator and accordingly the power of a TPU turbine.

Placement of the heat exchanger in this main line simplifies the design distinctions of engine arrangement.

The use of new systems and assemblies in the present invention makes it possible to ensure highly efficient and reliable ignition of non-hypergolic propellant components, for example, oxygen-kerosene propellant, to provide a programmed (slowed-down) starting of super-high-power LREs, excluding an abrupt dynamical effect of an engine upon the rocket, and to raise the efficiency of the system feeding fuel and oxidizer components and the rocket tank pressurization system.

The proposed liquid-propellant rocket engine may be most successfully used in rocket engineering, primarily for oxygen-kerosene high-thrust LREs, in which an oxidizing gas is used for the actuator of the main turbine.

What is claimed is:

1. A liquid-propellant rocket engine with turbine gas afterburning comprising:

a combustion chamber, inside which a mixing head for a working mixture is mounted and in which ignition injectors are provided;

booster prepumps—a fuel booster pump and an oxidizer booster pump, mounted at an engine inlet;

a turbopump unit comprising a turbine, a single-stage oxidizer pump and a two-stage fuel pump, which are made as centrifugal inclined Archimedian screw pumps and inlet main lines of which are connected to said booster prepumps respectively, an outlet of the first stage of the two-stage fuel pump is connected through a throttle sequentially to cooling passages of said chamber and through a start cut-off valve further to the mixing head of said combustion chamber;

a gas generator mixing head with injectors of which through an oxidizer start/cut-off valve is connected to an outlet of said oxidizer turbopump unit and through a thrust regulator is connected to an outlet of the second stage of the two-stage fuel pump of said turbopump unit, an outlet of the gas generator is connected to an inlet into said turbine of the turbopump unit, and through a gas feed line is connected to an inlet of said mixing head of the combustion chamber;

a programmable start and ignition device made with a starting tank with fuel, the tank being connected through a first check valve to said thrust regulator controlled by an electric drive, a first ampoule with starting fuel, an outlet of which through a start/cut-off valve is connected to injectors of said mixing head of the gas generator, wherein said starting tank is connected through a second check valve, a second ampoule with starting fuel and a jet to ignition injectors of the combustion chamber, and through a fill check valve is connected to a main fuel feed line to an input of the fuel pump.

2. A liquid-propellant rocket engine with turbine gas afterburning according to claim 1, wherein said oxidizer booster pump is made as an inclined Archimedian screw pump and is provided with a gas turbine which is its actuator, the working medium of which is oxidizing gas, tapped from said turbine of the turbopump unit, and after the booster pump on the gas turbine is actuated, released into its manifold.

3. A liquid-propellant rocket engine with turbine gas afterburning according to claim 1, wherein a heat exchanger is introduced into the LRE to heat a rocket tank pressurization gas, the heat exchanger being mounted on a pipeline for tapping oxidizing gas of said turbine of the turbopump unit to drive said oxidizer booster pump.

4. A liquid-propellant rocket engine with turbine gas afterburning according to claim 3, wherein the pipeline for tapping said oxidizing gas is led out downstream of the turbine of the turbopump unit.

5. A liquid-propellant rocket engine with turbine gas afterburning according to claim 1, wherein helium is used as a gas for pressurizing the rocket tanks.

6. A liquid-propellant rocket engine with turbine gas afterburning according to claim 1, wherein a mixture of triethyl boron and triethyl aluminum is used as the starting fuel.

7. A liquid-propellant rocket engine with turbine gas afterburning according to claim 1 or 6, wherein the first ampoule with the starting fuel is equipped with a diaphragm, made with the possibility of breaking under the action of pressure.

8. A liquid-propellant rocket engine with turbine gas afterburning according to claim 1 or 6, wherein the second ampoule with the starting fuel is equipped with a diaphragm, made with the possibility of breaking under the action of pressure.

* * * * *

UNITED STATES PATENT AND TRADEMARK OFFICE
CERTIFICATE OF CORRECTION

PATENT NO. : 6,226,980 B1
DATED : May 8, 2001
INVENTOR(S) : Katorgin et al.

It is certified that error appears in the above-identified patent and that said Letters Patent is hereby corrected as shown below:

<u>Title page,</u>
Item [73], Assignee, delete: "Otkrytoe Aktsionernoe Obschestvo Nauchono-Proizvodstvennoe Obiedinenie "Energomash" Imeni Akademika V.P. Glushko (RU)" and insert -- Otkrytoe Aktsionernoe Obschestvo "Nauchono-Proizvodstvennoe Obiedinenie "Energomash" Imeni Akademika V.P. Glushko" (RU) --.

Signed and Sealed this

Nineteenth Day of March, 2002

*Attest:*

JAMES E. ROGAN
*Attesting Officer*    Director of the United States Patent and Trademark Office